United States Patent
Ice

(10) Patent No.: US 7,439,492 B1
(45) Date of Patent: Oct. 21, 2008

(54) NONDISPERSIVE NEUTRON FOCUSING METHOD BEYOND THE CRITICAL ANGLE OF MIRRORS

(75) Inventor: Gene E. Ice, Oak Ridge, TN (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 308 days.

(21) Appl. No.: 11/344,044

(22) Filed: Feb. 1, 2006

Related U.S. Application Data

(60) Provisional application No. 60/651,124, filed on Feb. 4, 2005.

(51) Int. Cl.
*G21C 11/06* (2006.01)
(52) U.S. Cl. .............. 250/251; 250/505.1; 376/458
(58) Field of Classification Search ........... 250/251, 250/505.1; 378/84, 145; 376/458, 904, 906
See application file for complete search history.

(56) References Cited

U.S. PATENT DOCUMENTS

| | | | |
|---|---|---|---|
| 5,082,621 A | 1/1992 | Wood | |
| 5,167,912 A | 12/1992 | Wood | |
| 5,949,840 A | 9/1999 | Greene | |
| 6,738,552 B2 * | 5/2004 | Hirsch | 385/133 |
| 2002/0021782 A1 * | 2/2002 | McDonald | 378/84 |

OTHER PUBLICATIONS

Gene E. Ice, Provisional U.S. Patent Application, Nondispersive neutron focusing method beyond the critical angle of mirrors, pp. 1-3 & 1 Figure.

White Paper on: High-Performance Nondispersive Focusing-Optics for Thermal Neutrons, pp. 4-11.

T. Osakabe, et. al Development of a thermal neutron focusing device using neutron supermirrors, 2005 American Institute of Physics, pp. 1-5.

Judy Pang, High-Performance Kirkpatrick-Baez Super Mirrors for Neutron Milli- and Micro-Beams, Metals and Ceramics Division, ORNL, NESE, Vienna 2005, 26 pages.

G.E. Ice, et. al High-Performance Kirkpatrick-Baez Super Mirrors for Neutron Milli- and Micro-Beans, Metals and Ceramics Division,Oak Ridge National Laboratory, Oak Ridge, TN.

(Continued)

*Primary Examiner*—Kiet T Nguyen
(74) *Attorney, Agent, or Firm*—Esther Lois Roberts; Emily G. Schneider; Paul A. Gottlieb

(57) ABSTRACT

This invention extends the Kirkpatrick-Baez (KB) mirror focusing geometry to allow nondispersive focusing of neutrons with a convergence on a sample much larger than is possible with existing KB optical schemes by establishing an array of at least three mirrors and focusing neutrons by appropriate multiple deflections via the array. The method may be utilized with supermirrors, multilayer mirrors, or total external reflection mirrors. Because high-energy x-rays behave like neutrons in their absorption and reflectivity rates, this method may be used with x-rays as well as neutrons.

12 Claims, 8 Drawing Sheets

OTHER PUBLICATIONS

Paul Kirkpatrick, et. al, Formation of Optical Images by X-Rays, Stanford University, Stanford, California, Mar. 12, 1948, pp. 766-774.

T. Osakabe, et. al Development of a thermal neutron focusing device using neutron supermirrors, 2005 American Institute of Physics, pp. 1-5.

Judy Pang, High-Performance Kirkpatrick-Baez Super Mirrors for Neutron Milli- and Micro-Beams, Metals and Ceramics Division, ORNL, NESE, Vienna 2005, 26 pages.

Paul Kirkpatrick, et. al, Formation of Optical Images by X-Rays, Stanford University, Stanford, California, Mar. 12, 1948, pp. 766-774.

* cited by examiner

NONDISPERSIVE NEUTRON FOCUSING METHOD BEYOND THE CRITICAL ANGLE OF MIRRORS

STATEMENT REGARDING PRIORITY

This invention claims the benefit of U.S. Provisional Application No. 60/651,124 filed Feb. 4, 2005.

STATEMENT REGARDING FEDERALLY SPONSORED RESEARCH OR DEVELOPMENT

This invention was made with Government support under United States Department of Energy Contract No. DE-AC05-00OR22725 awarded by the United States Department of Energy. The Government has certain rights in this invention.

BACKGROUND OF THE INVENTION

Since the 1950s, scientists have developed neutron scattering techniques to better utilize neutrons in research areas such as nuclear physics, advanced synthetic materials development, and macroscopic structural analysis. Research facilities such as the Spallation Neutron Source are dedicated to neutron-related science. Such facilities require complex generation, focus, and collection of neutrons. In the interest of time and cost effectiveness, it is essential to develop superior methods to capture and focus neutrons.

Neutrons are typically delivered close to a sample by the use of a neutron guide made of supermirrors to direct the source beam of neutrons. The neutron guide moves the source phase space close to the sample to increase the flux on samples. If the sample is small and the guide tube not in direct contact with the sample, however, the divergence of the beam after the guide must be limited to maintain a small beam on the sample. This makes it highly advantageous to use focusing for small samples, and in realistic conditions, it is estimated that a simple Kirkpatrick-Baez (KB) super mirror system can focus about 100 times as many neutrons onto a 100 micron sized spot at the sample than is possible with a guide tube. Much better performance than even this major improvement over common practice will be possible if the convergence angles of the neutrons from the KB mirror system can be increased.

A single mirror surface focusing in the meridional direction can collect at most a convergence 2 times its critical angle, and a practical single mirror surface can collect only about its critical angle in convergence. A sagittal focusing or figure of revolution mirror system (e.g., a Wolter Optics system) can collect up to 4 times its critical angle, but there is a hole in the convergence distribution, and it is difficult or impossible to produce a system of this type that can achieve the glancing angles needed to deflect thermal neutrons. Kumakov lenses can collect large divergences, but are very inefficient because they have intrinsically small scattering angles and large absorption in the optics.

U.S. Pat. Nos. 5,082,621 and 5,167,912, both to Wood, show a neutron reflecting supermirror structure, however, both are limited to the structure of the supermirror surface and do not address the geometry of how to use the supermirror surface for focusing. In addition, there is no discussion of an array composition of supermirrors nor nondispersive focusing of neutrons via an array composition of supermirrors.

U.S. Pat. No. 5,949,840 to Greene teaches a neutron guide, however, the guide as disclosed is limited to fabrication of the guide surface and structure, and does not address the geometry of how to use the guide for focusing neutrons. In addition, there is no discussion of an array composition of supermirrors nor nondispersive focusing of neutrons via an array composition of supermirrors.

Accordingly, a need in the art exists for a method to extend the KB mirror focusing geometry to allow nondispersive focusing of neutrons with a convergence on a sample much larger than is possible with existing KB optical schemes.

SUMMARY OF THE INVENTION

In view of the above need, it is an object of the present invention to provide a method for the extension of the KB mirror focusing geometry to allow focusing of neutrons with a convergence on the sample much larger than is possible with existing KB optical schemes, but with the advantageous small beam producing capabilities and source brilliance conserving properties intact.

It is another object of the present invention to provide a method to allow focusing of neutrons utilizing at least three KB supermirrors.

It is another object of the present invention to provide a method to allow focusing of neutrons utilizing at least three multilayer mirrors.

It is another object of the present invention to provide a method to allow focusing of neutrons utilizing at least three total external reflection mirrors.

Briefly, the present invention is a method for nondispersive neutron focusing beyond the critical angle of mirrors by positioning an array of mirrors to deflect neutrons at a preferred angle.

One aspect of the present invention comprises the steps of: placing one mirror at an optimal angle to another mirror such that the neutron source beam is directed towards a focused point.

In accordance with another aspect of the invention, several mirrors may be placed at optimal angles to one another, creating an array of mirrors such that the neutron source beams are directed towards a focused point.

In accordance with another aspect of the invention, numerous mirrors may be placed at optimal angles to one another in at least two dimensions, creating a three-dimensional array of mirrors such that the neutron source beams are directed towards a focused point.

Additional objects, advantages and novel features of the invention will be set forth in part in the description which follows, and in part will become apparent to those skilled in the art upon examination of the following or may be learned by practice of the invention. For example, the geometrical principles of this invention can be applied to any specularly reflecting focusing system including, but not limited, to nickel-coated mirrors, multilayer mirrors, or total external reflection mirrors. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate preferred embodiments of the invention, and, together with the description, serve to explain principles of the invention.

DETAILED DESCRIPTION OF THE INVENTION

In striving to develop superior methods to capture and focus neutrons, it was realized that no combination of deflections where all the neutron rays bounce off the same mirrors can collect more than about the critical angle in the plane of scatter. However, if some rays bounce off one mirror, and some rays bounce off two or more mirrors, then the total collected divergence can be greatly increased. With up to two deflections, the convergence can be increased by a factor of 3. With up to three deflections, the convergence can be increased by a factor of 5. Since these improvements are in two axes, the total flux can be improved by around a factor of 9 to 25 over conventional systems. Because the KB geometry preserves source brilliance at the sample, this invention provides the highest possible neutron flux into a small sample volume within the convergence limitation of the optics. Because the convergence limitation can now be greatly extended, flux densities up to and even greater than an order of magnitude beyond those previously possible can be realized and is achievable since the technology for producing high-performance flat and elliptical neutron and x-ray mirrors is well established. In view of the above need, a new invention, a nondispersive neutron focusing method beyond the critical angle of mirrors, was developed.

Figure 1:
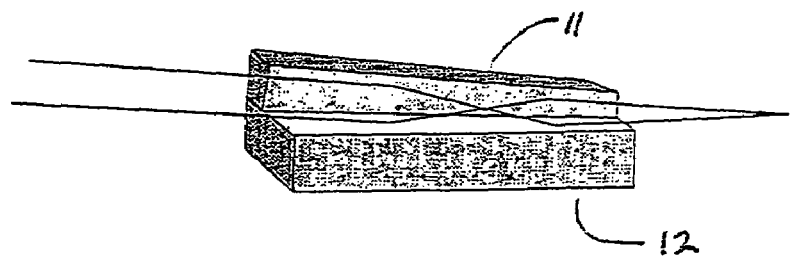
FIG. 1 is a diagram illustrating two mirrors arrayed in such a way so that one mirror deflects a neutron source beam vertically and one mirror deflects a neutron source beam horizontally.
Figure 2:
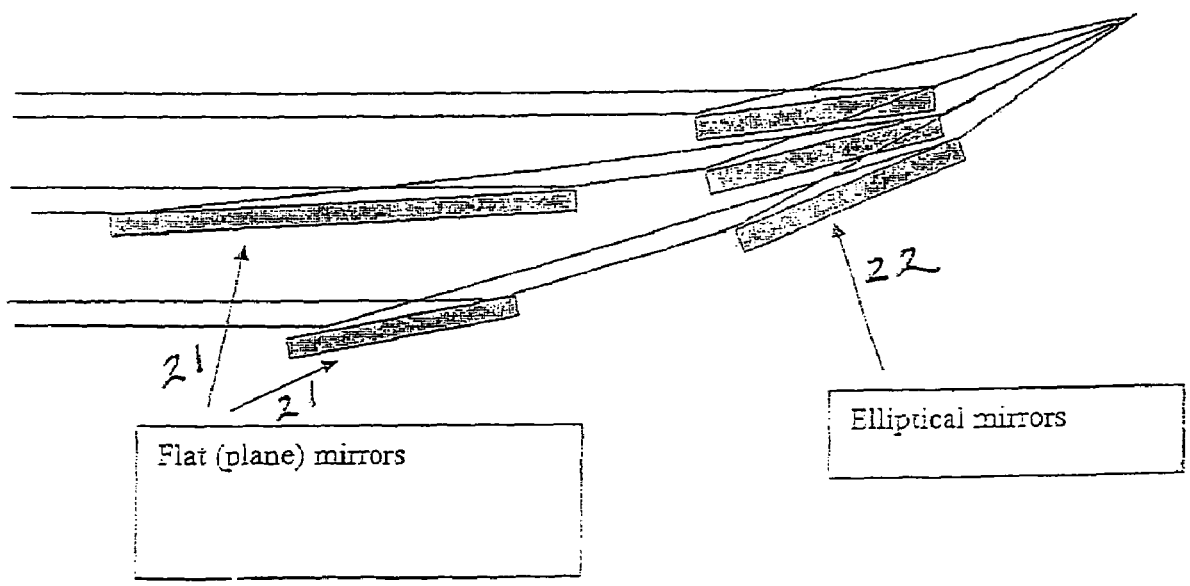
FIG. 2 is a diagram illustrating an array of mirrors arrayed in such a way that deflection of a neutron source beam occurs first by flat mirrors and second by elliptical mirrors.
Figure 3:
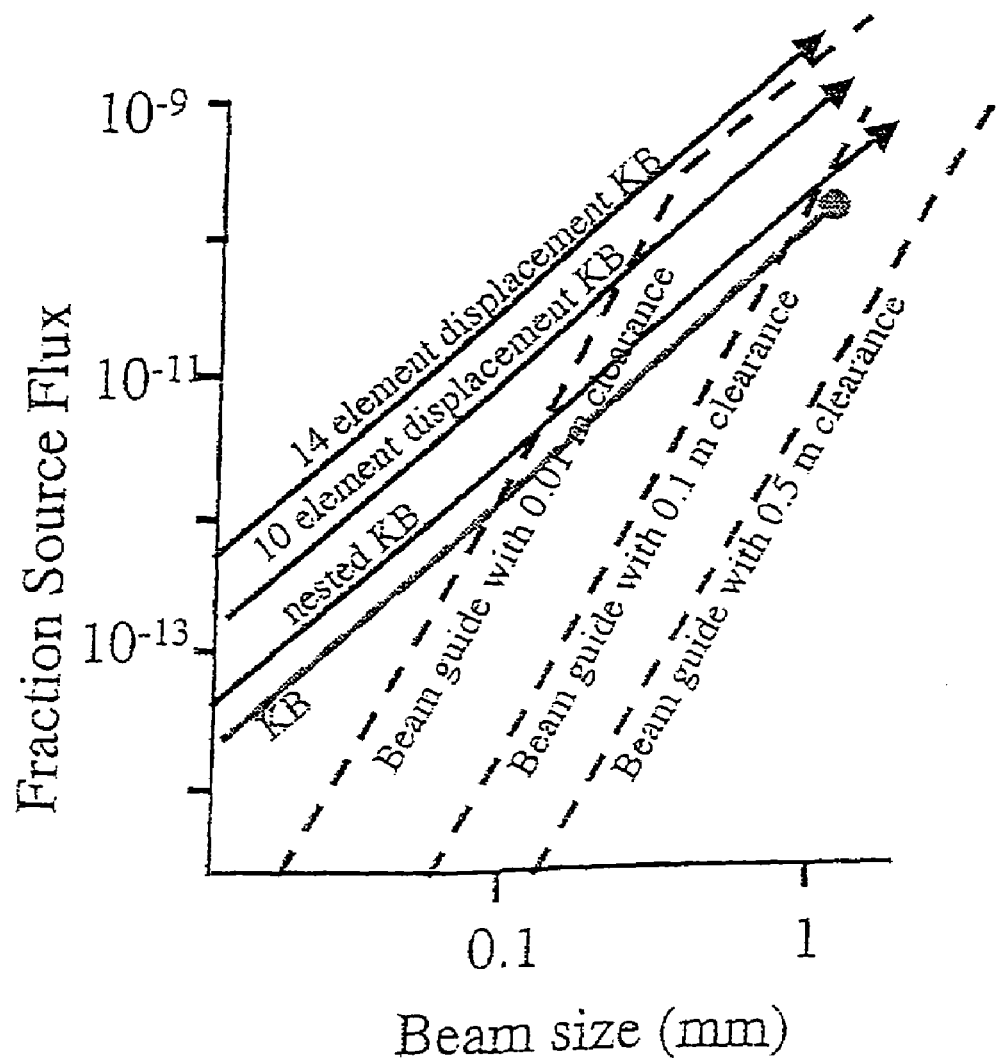
FIG. 3 is a chart illustrating a comparison between KB supermirrors, nested KB supermirrors and deflecting KB supermirrors of the estimated relative performance of the most advanced beam guide optics.
Figure 4:
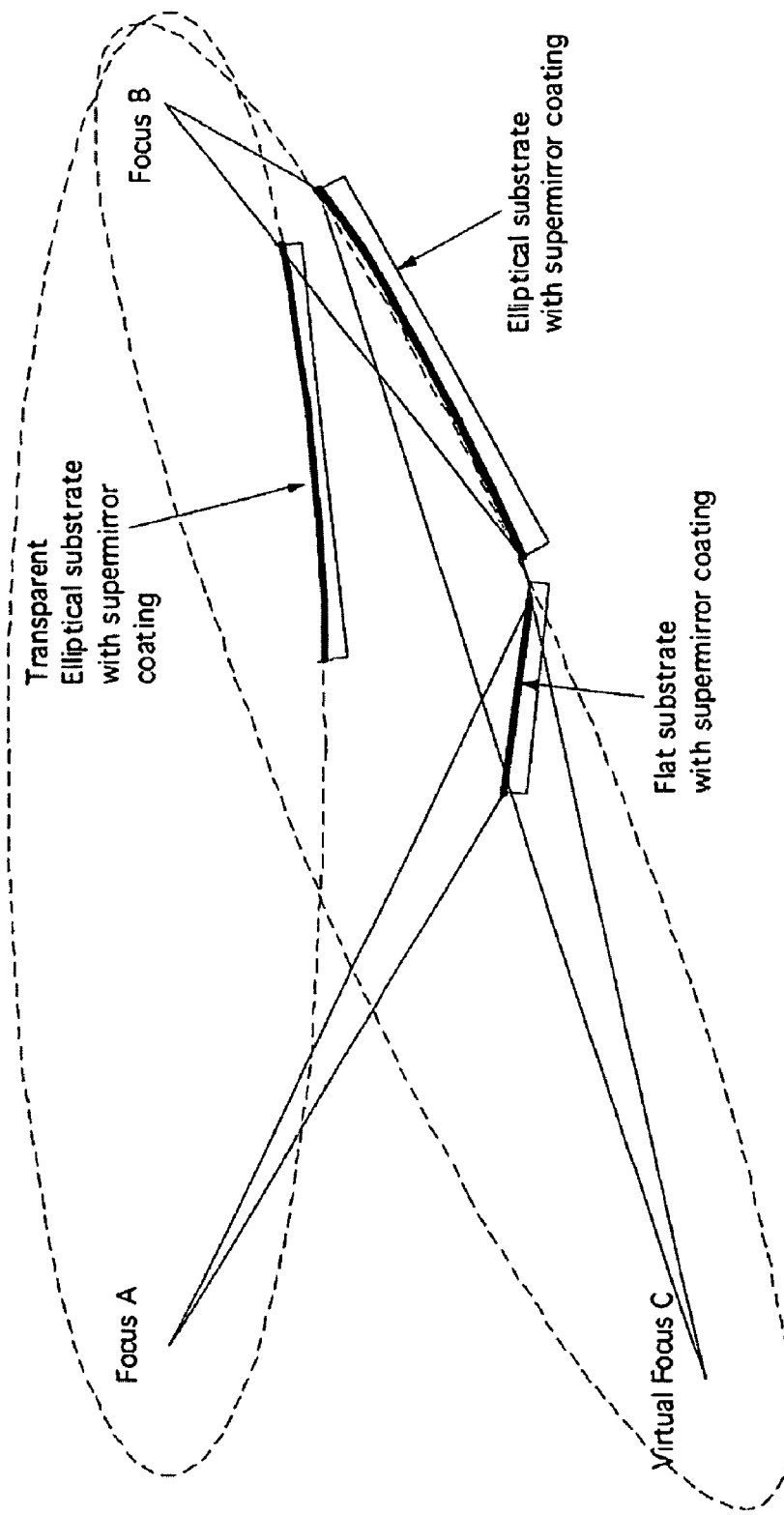
FIG. 4 is a diagram illustrating an array of at least three supermirrors, at least two elliptical supermirrors and at least one flat supermirror.
Figure 5:
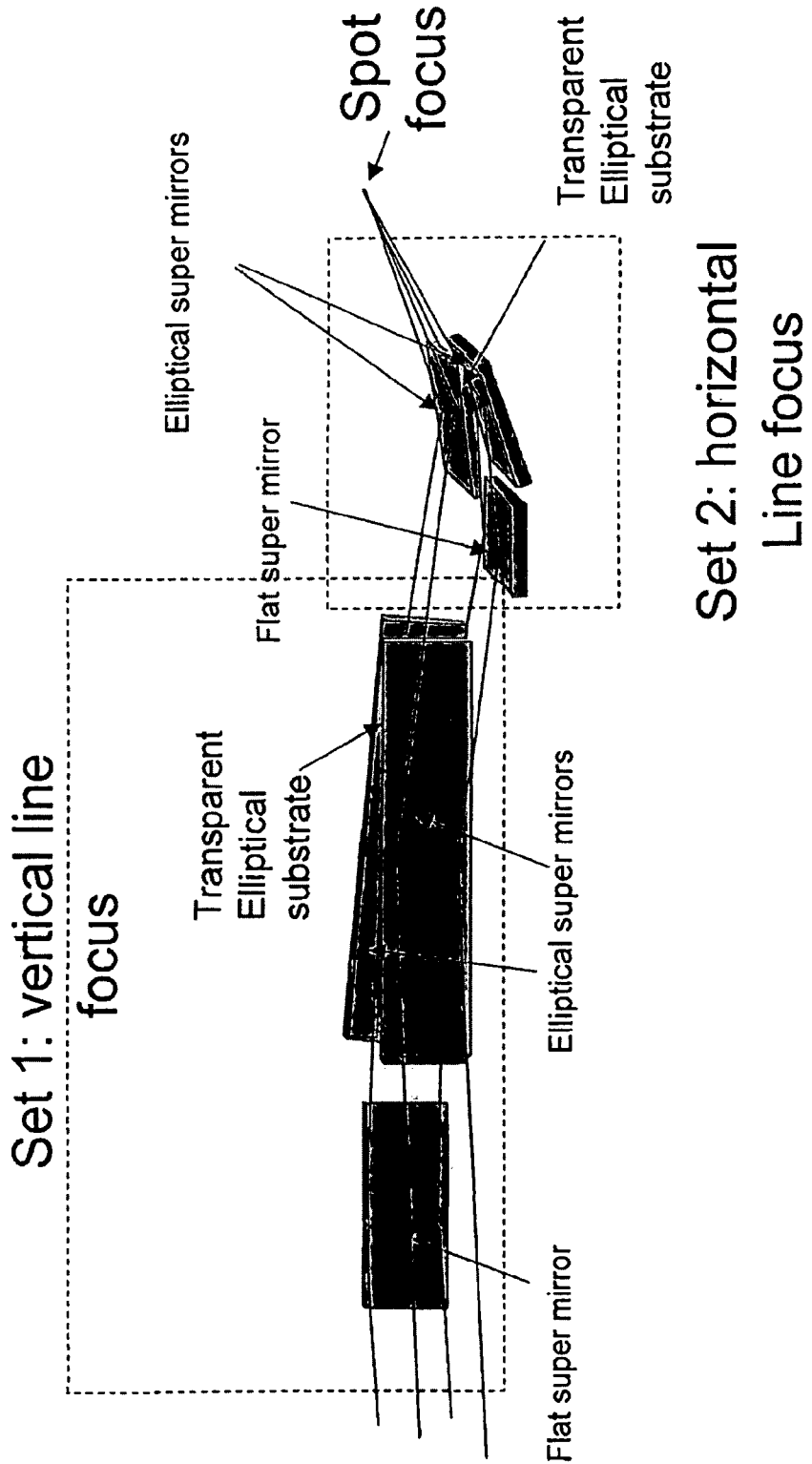
FIG. 5 is a diagram illustrating an array of at least two sets of three supermirrors, at least four elliptical supermirrors and at least two flat supermirrors.
Figure 6:
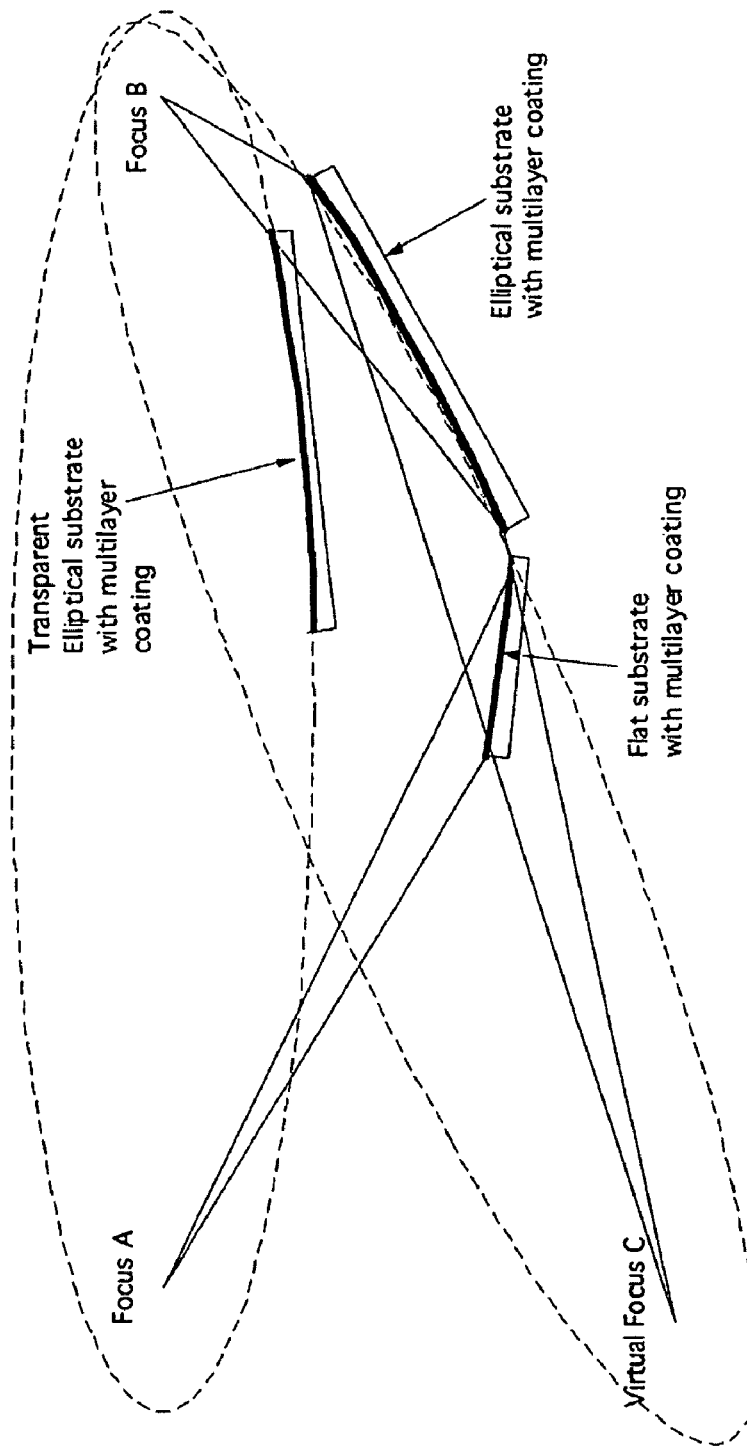
FIG. 6 is a diagram illustrating an array of at least three multilayer mirrors, at least two elliptical multilayer mirrors and at least one flat multilayer mirror.
Figure 7:
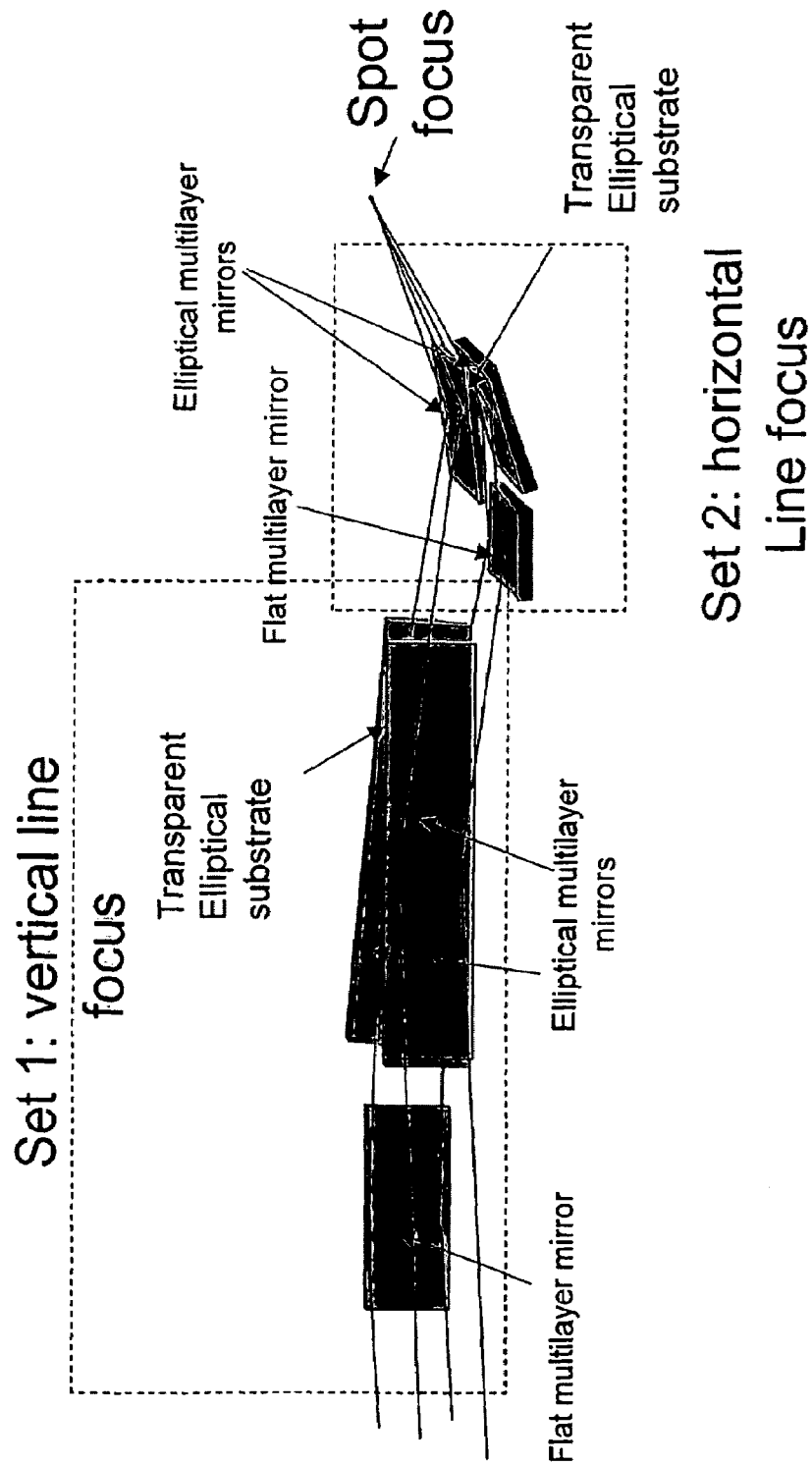
FIG. 7 is a diagram illustrating an array of at least two sets of three multilayer mirrors, at least four elliptical multilayer mirrors and at least two flat multilayer mirrors.
Figure 8:
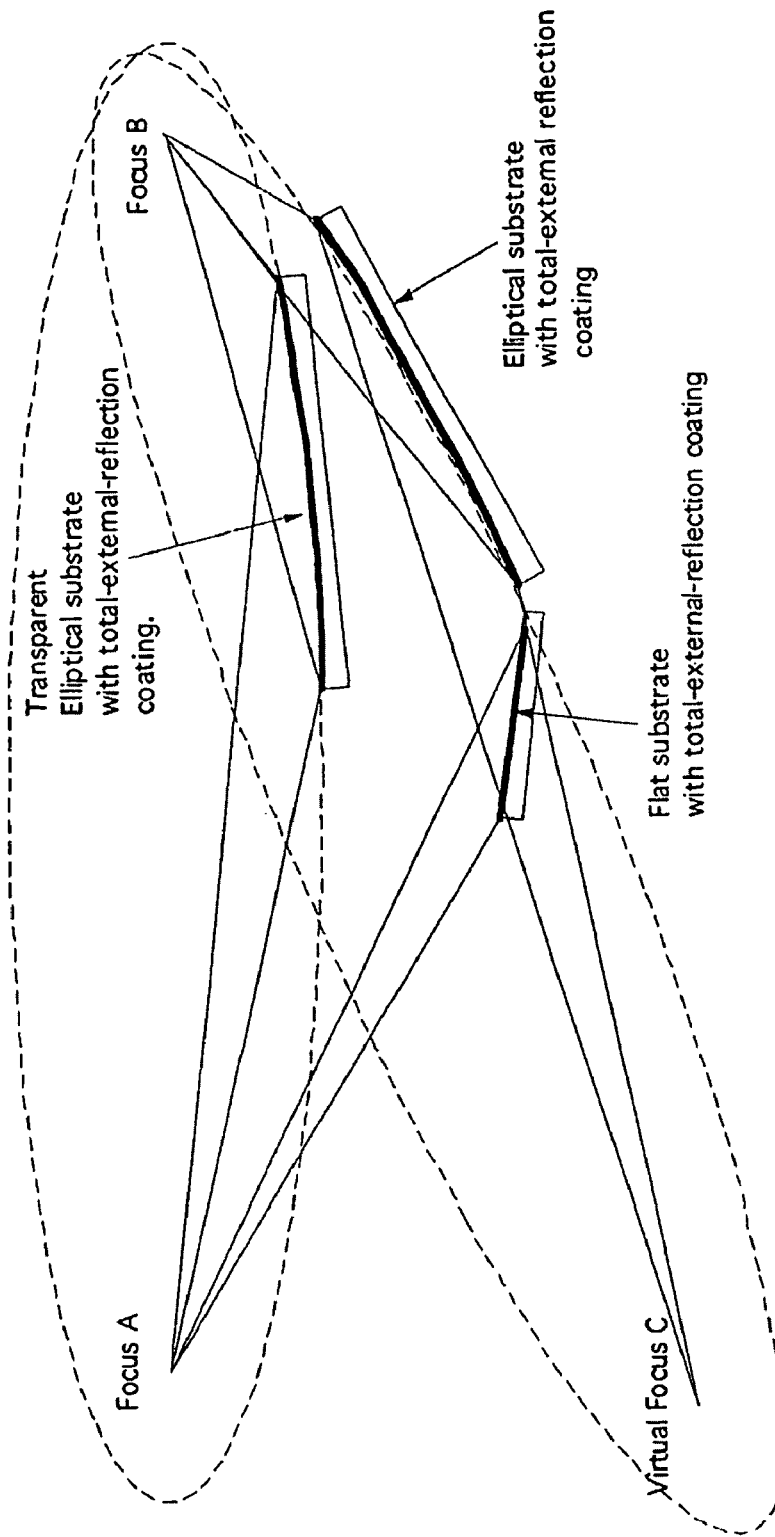
FIG. 8 is a diagram illustrating an array of at least three total external reflection mirrors, at least two elliptical total external reflection mirrors and at least one flat total external reflection mirror.
Figure 9:
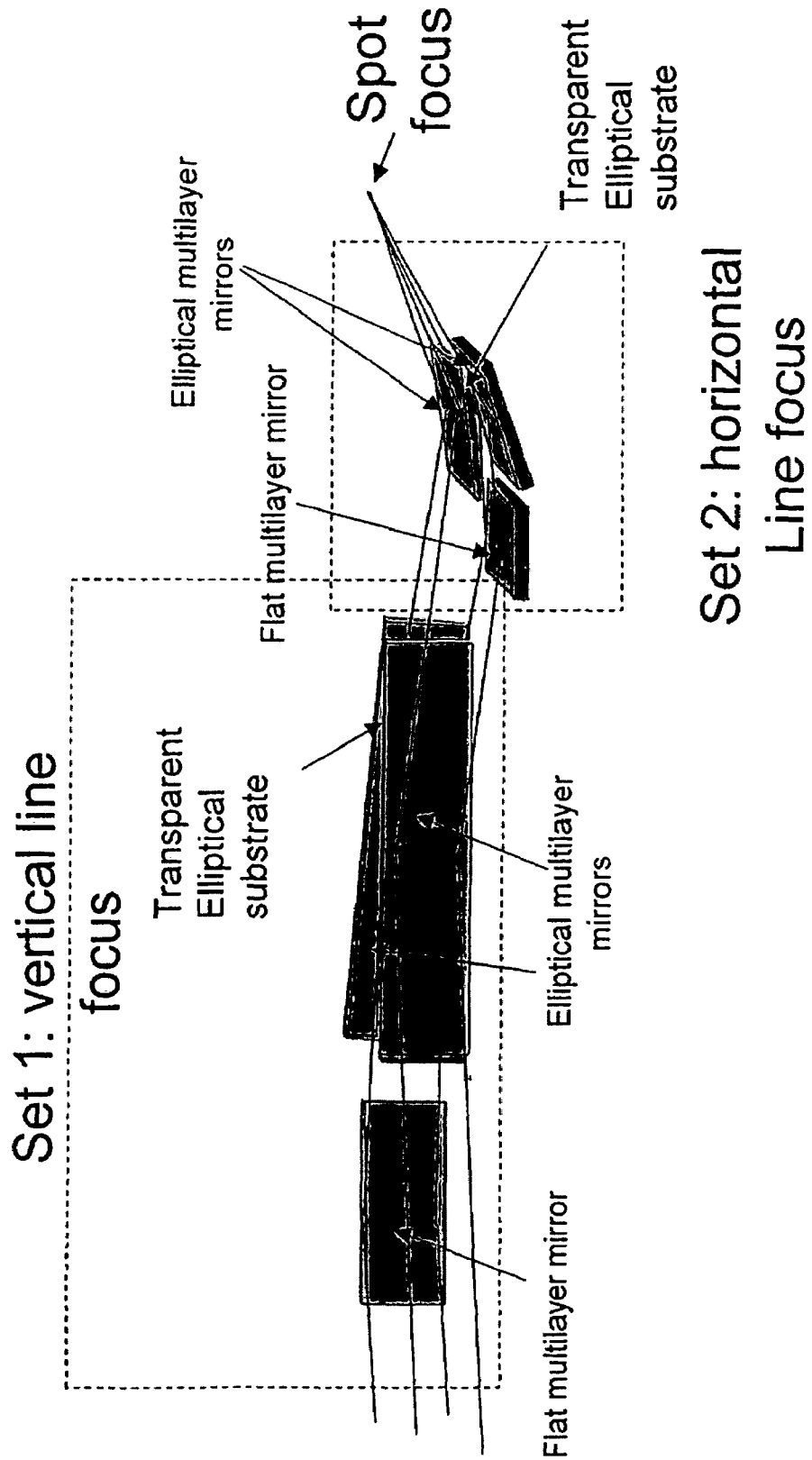
FIG. 9 is a diagram illustrating an array of at least two sets of three total external reflection mirrors, at least four elliptical total external reflection mirrors and at least two flat total external reflection mirrors.

One way to extend mirror technology is based on mirrors nested together where some neutron source beam rays strike a vertically deflecting mirror first and some neutron source beam rays strike a horizontally deflecting mirror to produce line focusing. FIG. 1 shows a simple mirror system made with elliptical supermirrors (Osmic Corporation, Auburn Hills, Mich.). Consider the behavior in one axis, in which a single elliptical mirror focuses line-to-line. By duplicating the first KB mirror 11 and arranging it so its lowest angle neutron source beam 13 follows the same path as the highest angle neutron source beam 13 of the second mirror 12 and its focal length is the same to the sample, the divergence on the sample is doubled. The axis of the second mirror 12, however, is not oriented along the nominal beam axis. As shown in FIG. 2, this orientation issue is corrected with a flat mirror 21 set at half the nominal angle of the two elliptical mirrors 22 that aligns the neutron source beam axis 23 for the second elliptical mirror 22 so the neutron source beam 23 is set to focus at the same angle as the first elliptical mirror 22. This process can be extended with other mirrors, with increasing numbers and complexity of mirrors to produce point focusing. See FIG. 2.

The mirror lengths can be adjusted to compromise between a more compact design with less demanding optical elements, and a design with fewer optical elements: shorter mirrors are sometimes easier to fabricate and take up less room along the neutron source beam axis. However, shorter mirrors mean that more mirrors must be mounted and aligned.

The final focusing-mirror elliptical surfaces are determined by the x-ray critical angle and the demagnification. For example, if F1 is the effective object distance and F2 is the image distance, (magnification=F2/F1), and theta is the nominal glancing angle at the center of the mirror, then the elliptical surface has primary axis A and secondary axis B given by, $A=(F_1+F_2)/2$; and $B=\sqrt{A^2-Z^2/4}$. Here Z is the distance between foci on the ellipse; $Z^2=F_1^2+F_2^2-2F_1F_2\cos(\pi-2\theta)$.

EXAMPLE

The following example is given to illustrate the process of the invention and is not to be taken as limiting the scope of the invention which is defined in the appended claims.

For one possible configuration of a multiple mirror array, two sets of three mirrors are utilized. For each set of three mirrors, two mirrors must be elliptical and one mirror must be a flat mirror. Thus, in this example of two sets of three mirrors, there are four elliptical mirrors and two flat mirrors. The flat mirrors are set to deflect the neutron source beam first. The neutron source beam deflects off the flat mirrors and is next deflected off the elliptical mirrors. The elliptical surface geometry being determined using the formulas provided above, these elliptical mirrors will deflect the neutron source beam into a preferred focal point. See FIG. 2.

The mirrors used in the present invention may also be total external reflection or multilayer mirrors.

The described optics allow neutron measurements on much smaller samples. The described optics can replace expensive neutron guides for many applications and provide better initial performance and an easier path to upgrade with evolving technology. Further, because high-energy x-rays behave like neutrons in their absorption and reflectivity rates, this method may be used with x-rays as well as neutrons.

Thus, it will be seen that a nondispersive neutron focusing method beyond the critical angle of mirrors has been provided. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for nondispersive neutron line focusing beyond the critical angle of mirrors comprising the step of:
    positioning an array of at least three supermirrors, at least two elliptical supermirrors and at least one flat supermirror, to deflect neutrons at a preferred angle so as to enable nondispersive neutron line focusing.

2. The method of claim 1, wherein said positioning step comprises:

positioning said array of at least three supermirrors so that all supermirrors reflect at angles less than said critical angle so as to enable nondispersive neutron line focusing.

3. A method for nondispersive neutron point focusing beyond the critical angle of mirrors comprising the step of:
positioning an array of at least two sets of three supermirrors, at least four elliptical supermirrors and at least two flat supermirrors, so that said first set of at least three supermirrors deflect neutrons vertically and said second set of at least three supermirrors deflect neutrons horizontally at a preferred angle so as to enable nondispersive neutron point focusing.

4. The method of claim 3, wherein said positioning step further comprises:
positioning said array of at least two sets of three supermirrors, at least four elliptical supermirrors and at least two flat supermirrors, so that said first set of at least three supermirrors deflect neutrons vertically and said second set of at least three supermirrors deflect neutrons horizontally, and so that all supermirrors reflect at angles less than said critical angle so as to enable nondispersive neutron point focusing.

5. A method for nondispersive neutron line focusing beyond the critical angle of mirrors comprising the step of:
positioning an array of at least three multilayer mirrors, at least two elliptical multilayer mirrors and at least one flat multilayer mirror, to deflect neutrons at a preferred angle so as to enable nondispersive neutron line focusing.

6. The method of claim 5, wherein said positioning step further comprises:
positioning said array of at least three multilayer mirrors, at least two elliptical multilayer mirrors and at least one flat multilayer mirror, so that all multilayer mirrors reflect at angles less than said critical angle so as to enable nondispersive neutron line focusing.

7. A method for nondispersive neutron point focusing beyond the critical angle of mirrors comprising the step of:
positioning an array of at least two sets of three multilayer mirrors, at least four elliptical multilayer mirrors and at least two flat multilayer mirrors, so that said first set of at least three multilayer mirrors deflect neutrons vertically and said second set of at least three multilayer mirrors deflect neutrons horizontally at a preferred angle so as to enable nondispersive neutron point focusing.

8. The method of claim 7, wherein said positioning step further comprises:
positioning said array of at least two sets of three multilayer mirrors, at least four elliptical multilayer mirrors and at least two flat multilayer mirrors, so that said first set of at least three multilayer mirrors deflect neutrons vertically and said second set of at least three multilayer mirrors deflect neutrons horizontally, and so that all multilayer mirrors reflect at angles less than said critical angle so as to enable nondispersive neutron point focusing.

9. A method for nondispersive neutron line focusing beyond the critical angle of mirrors comprising the step of:
positioning an array of at least three total external reflection mirrors, at least two elliptical total external reflection mirrors and at least one flat total external reflection mirror, to deflect neutrons at a preferred angle so as to enable nondispersive neutron line focusing.

10. The method of claim 9, wherein said positioning step further comprises:
positioning said array of at least three total external reflection mirrors, at least two elliptical total external reflection mirrors and at least one flat total external reflection mirror, so that all total external reflection mirrors reflect at angles less than said critical angle so as to enable nondispersive neutron line focusing.

11. A method for nondispersive neutron point focusing beyond the critical angle of mirrors comprising the step of:
positioning an array of at least two sets of three total external reflection mirrors, at least four elliptical total external reflection mirrors and at least two flat total external reflection mirrors, so that said first set of at least three total external reflection mirrors deflect neutrons vertically and said second set of at least three total external reflection mirrors deflect neutrons horizontally at a preferred angle so as to enable nondispersive neutron point focusing.

12. The method of claim 11, wherein said positioning step further comprises:
positioning said array of at least two sets of three total external reflection mirrors, at least four elliptical total external reflection mirrors and at least two flat total external reflection mirrors, so that said first set of at least three total external reflection mirrors deflect neutrons vertically and said second set of at least three total external reflection mirrors deflect neutrons horizontally, and so that all total external reflection mirrors reflect at angles less than said critical angle so as to enable nondispersive neutron point focusing.

* * * * *